United States Patent [19]
Päivinen

[11] Patent Number: 5,938,987
[45] Date of Patent: Aug. 17, 1999

[54] METHOD AND ARRANGEMENT FOR PRODUCING A BASIC ELEMENT OF A MULTI-ELEMENT OPTICAL CABLE

[75] Inventor: Teuvo Päivinen, Lahela, Finland

[73] Assignee: NK Cables OY, Espoo, Finland

[21] Appl. No.: 08/981,210

[22] PCT Filed: Jul. 30, 1996

[86] PCT No.: PCT/FI96/00393

§ 371 Date: Mar. 24, 1998

§ 102(e) Date: Mar. 24, 1998

[87] PCT Pub. No.: WO97/02503

PCT Pub. Date: Jan. 23, 1997

[30] Foreign Application Priority Data

Jul. 6, 1995 [FI] Finland ................................. 953339

[51] Int. Cl.[6] .................................................. B29D 11/00
[52] U.S. Cl. .................... 264/1.28; 264/1.29; 264/40.1; 425/113; 425/114; 425/135; 427/163.2
[58] Field of Search ................... 264/1.28, 1.29, 264/1.25, 40.1; 425/113, 114, 135, 392; 57/7; 427/163.2

[56] References Cited

U.S. PATENT DOCUMENTS

| | | | |
|---|---|---|---|
| 4,446,686 | 5/1984 | Panuska et al. | 264/1.28 |
| 4,585,406 | 4/1986 | Ravela | 264/1.28 |
| 4,814,116 | 3/1989 | Oestreich et al. | 264/1.28 |
| 4,893,998 | 1/1990 | Schlaeppi et al. | |
| 4,956,039 | 9/1990 | Olesen et al. | 264/1.28 |
| 5,102,584 | 4/1992 | Paivinen et al. | 264/1.28 |
| 5,372,757 | 12/1994 | Schneider | 264/1.28 |
| 5,658,598 | 8/1997 | Veijanen | 425/113 |
| 5,676,892 | 10/1997 | Kertscher | 264/1.28 |
| 5,830,304 | 11/1998 | Priesnitz et al. | 264/1.28 |

FOREIGN PATENT DOCUMENTS

| | | |
|---|---|---|
| 0286819 | 10/1988 | European Pat. Off. . |
| 0327164 | 1/1989 | European Pat. Off. . |
| 94989 | 7/1995 | Finland . |
| 3425649 | 1/1986 | Germany . |
| 3822566 | 1/1990 | Germany . |

*Primary Examiner*—Mathieu D. Vargot
*Attorney, Agent, or Firm*—Ladas & Parry

[57] ABSTRACT

A method and arrangement for producing a basic element of a multi-element fibre optic cable having a coating tool (6) for forming a tubular sheathing around a single optical fibre (3) or a fibre bundle formed of several optical fibres (3), and a pulling device (8) placed after the coating tool (6) for pulling the sheathing and the fibres forward as a unit. In order to produce a stable product, the tension ($t_3$) of the fibres (3) passed to the coating tool (6) is kept continuously at a controlled level. The direction of travel of the fibres and the sheathing is kept straight before and at the pulling device (8), and the pulling device (8) is spaced from the coating tool (6) at a distance depending on the production rate of the production line, so that desired sliding of the fibres (30 inside the sheathing is provided at the pulling device (8).

6 Claims, 1 Drawing Sheet

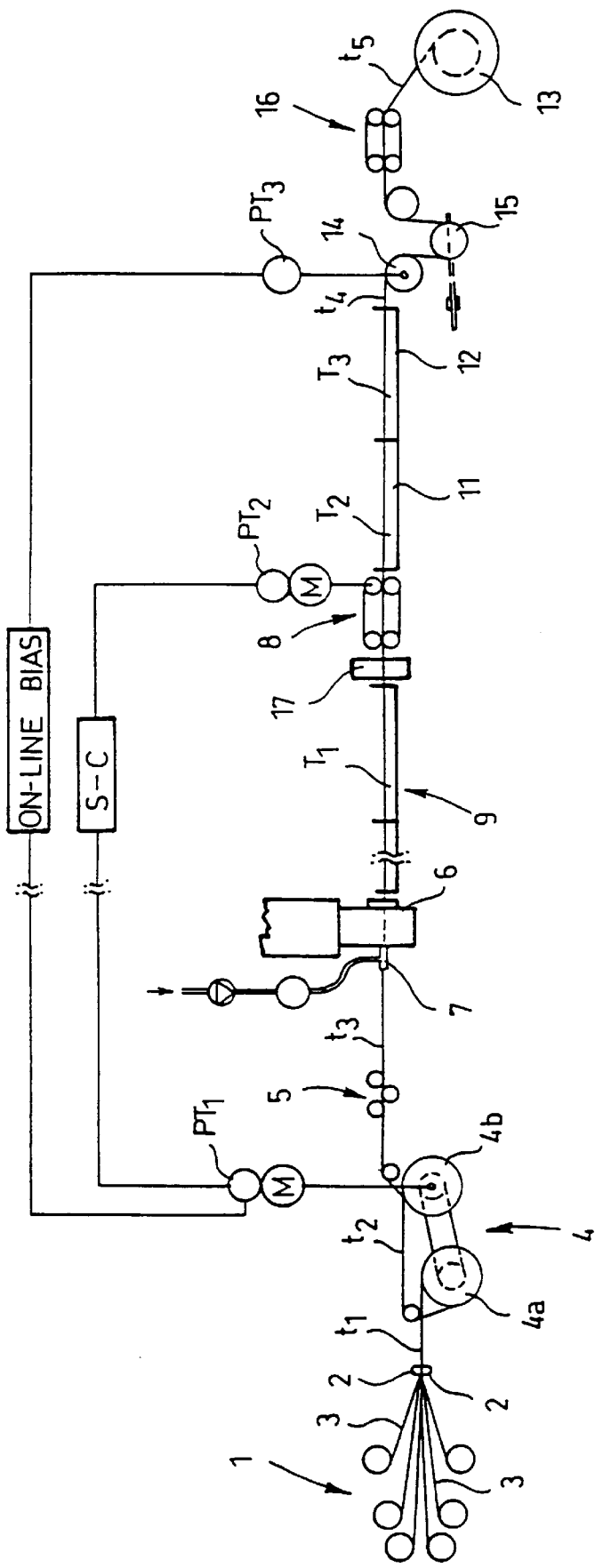

5,938,987

METHOD AND ARRANGEMENT FOR PRODUCING A BASIC ELEMENT OF A MULTI-ELEMENT OPTICAL CABLE

FIELD OF THE INVENTION

The invention relates to a method for producing a basic element of a multi-element optical cable, in which method a tubular sheathing is extruded loosely around a fibre or a fibre bundle consisting of several optical fibres, the fibres are provided with the desired excess length with respect to the sheathing, and the unit formed by the sheathing and the fibres is pulled forward from the place following the point of extrusion to the next stage in the production line. The invention also relates to an arrangement for producing a basic element of a multi-element optical cable.

BACKGROUND

Such methods and arrangements are rather well known at present in connection with producing optical cables. Examples of known solutions include arrangements described in U.S. Pat. No. 4,893,998, German patent 3,425,649 and European patent application 0,286,819.

The disadvantages of the aforementioned arrangements include for example that the direction of travel of the unit formed by the fibres and the tubular sheathing changes rather rapidly after the extrusion head, since the unit is passed around a so-called locking wheel. In a production line equipped with a locking wheel the amount of the fibres is limited, since otherwise the fibres are positioned one upon another on the locking wheel, whereupon the outermost fibres may break at the worst. In order to operate reliably especially under conditions where the temperature fluctuates, for example an SZ stranded cable having a so-called minipipe structure requires great stability of each component of the cable and controlled interaction between the components. Examples of matters that cannot be realized in the best possible manner with the prior arrangements include the levelling of the variation in the length of the fibres situated inside the same protective pipe or sheathing, which is the most important factor in an SZ stranded multi-fibre structure, wherefore controlled levelling during the manufacture of the cable is important for the final result. The levelling of the variation in the fibre length is controlled by regulating the mutual tension of the fibres. Another example concerns the dimensions of the pipe or sheathing acting as a protective housing. A third example relates to the relaxation following the manufacture of an individual protective pipe or sheathing and the control of the relaxation during the manufacture. The stability must be absolute in an SZ stranded structure.

SUMMARY OF THE INVENTION

The purpose of the invention is to provide a method and an arrangement with which the drawbacks of the prior solutions can be eliminated. This is achieved with the method and arrangement according to the invention. The method according to the invention is characterized in that the tension of the fibres passed to the point of coating is maintained continuously at a controlled level, that the direction of travel of the fibres and the sheathing is kept straight before the pulling point and at the pulling point, and that the pulling point is placed from the coating point at a distance depending on the production rate of the production line. The arrangement according to the invention is in turn characterized in that the tension of the fibres passed to the coating tool is arranged to be kept continuously at a controlled level, that the direction of travel of the fibres and the sheathing is arranged to remain straight before the pulling device and at the pulling device, and that the pulling device is placed from the coating tool at a distance depending on the production rate of the production line.

The primary advantage of the invention is that it enables an increase of about 200 to 300% in the production compared to the results achieved with the prior arrangements. It must be noted that the aforementioned increase in the production is achieved without sacrificing the existing criteria for quality. The invention makes it possible to increase the production rate manyfold compared to the present rates of production by means of development and improved materials. Another advantage of the invention is its simplicity, wherefore the introduction and use of the invention will be advantageous.

BRIEF DESCRIPTION OF THE DRAWINGS

The invention will be described in greater detail below by means of a preferred embodiment shown in the accompanying drawing, in which the only FIGURE is a schematic side view of the production line of a minipipe utilizing the invention. A minipipe refers to an element of a stranded multi-element cable.

DETAILED DESCRIPTION

The drawing FIGURE shows schematically the production line of a minipipe utilizing the invention. Reference numeral 1 generally denotes fibre supplies with tension control devices contained therein. Reference numeral 2 denotes guide wheels that are arranged to guide the fibres 3 to a fibre tension control device 4. The fibre tension control device 4 is as shown the FIGURE a device consisting of two successive wheels 4a, 4b, described in greater detail in Finnish patent application 953,338 filed simultaneously with the present application and corresponding U.S. application Ser. No. 08/981,579. It should be noted, however, that the present invention is not limited in any way to the tension control device shown in the FIGURE, but any other suitable apparatus may also be used as the tension control device. Reference numeral 5 denotes a device used for measuring the line tension of the fibres. The initial tension of the fibres is denoted in the FIGURE with $t_1$, the tension between the wheels 4a, 4b is denoted by $t_2$, and the tension of the fibres in the line by $t_3$.

The fibres 3 are passed from the starting reels to a coating tool 6 placed in the point of coating as shown in the FIGURE, the tool possibly comprising an extrusion head of an extrusion apparatus. By means of the coating tool 6, a loose tubular sheathing is extruded around the fibre bundle. At the point of coating, a filling gel is supplied inside the pipe acting as the sheathing by supply means 7 for filling gel. The coating tool 6, the supply means 7 for filling gel, and the composition of the gel constitute technology that is fully conventional for a person skilled in the art, wherefore they will not be described in greater detail in this connection.

After the coating tool, the unit formed by the pipe and the fibres is pulled through a precooling device 9 by means of a pulling device 8. From the pulling device 8 the unit consisting of the pipe and the fibres is passed via a relaxation zone 11 and a final cooling zone 12 to a receiving spooler 13. Reference numeral 14 denotes a measuring wheel of a pipe for ON-line excess length measurement of fibre (ON-line bias measurement), reference numeral 15 denotes a control dancer for the line tension of the pipe, and reference numeral 16 denotes a device, so-called line tension pillar, used for maintaining the line tension. Reference numeral 17 denotes a meter for measuring the diameter of the pipe.

The precooling temperature of the pipe is denoted in the FIGURE by $T_1$, the pipe relaxation temperature by $T_2$, and the final cooling temperature of the pipe by $T_3$. The line tension of the pipe is denoted by $t_4$, and the spooling tension of the pipe is in turn denoted by $t_5$. $PT_1$ denotes a pulse tachometer used for measuring the fibre to be supplied inside, $PT_2$ denotes a pulse tachometer for the speed point, and $PT_3$ denotes a pulse tachometer for measuring an outcoming pipe.

According to an essential idea of the invention, the tension of the fibres supplied to the point of coating, i.e. to the coating tool 6, is maintained continuously at the desired level. With the controlled tension, it is possible to provide the adjustment of the excess length of the fibre. By means of the fibres and the coating tool, the direction of travel of the pipe or sheathing extruded around the fibres is kept straight before the point of pulling. The pulling point is positioned from the coating point at a distance depending on the production rate of the production line, so that the desired sliding of the fibres 3 with respect to the sheathing is provided at the point of pulling. The position of the pulling point can preferably be made adjustable according to the production rate of the production line. This can be realized for example in such a way that the pulling device 8 is placed in the line so that its position with respect to the coating tool 6 can be changed. It can be mounted for example by means of suitable rail structures. A belt pulling device can be preferably used as the pulling device.

The operation of the invention is thus based on the controlled tension of the fibre(s) and on the sliding of the fibre(s) inside the protective pipe during the manufacture, which aims at providing a controlled excess length for the fibre. The above-described matter can also be defined in such a way that during the manufacture, the sliding of the fibre(s) compensates for the positiveness of the excess fibre caused by the relaxation and the thermal contraction of the pipe. It must be noted that the continuous control of the fibre tension is the most important controlled variable as regards both the sliding of the fibres and the recovery of tension. The sufficient controlled sliding of the fibres is only possible in a straight line. In a line provided with a locking wheel, the physical limits of the line restrict the sliding at too early a stage.

The sliding of the fibres can be implemented when the pulling device 8 in the line is a belt pulling device that is placed at a suitable distance from the extrusion head 6 in view of the production rate of the line. With the controlled fibre tension, the amount of the fibre to be supplied can be adjusted so that the sufficient sliding of the fibres with respect to the pipe can be implemented at the belt pulling device.

In the above-described manner, the positiveness caused by the thermal contraction and the relaxation can be entirely compensated for in controlling the fibre excess length of the pipe. The sliding of the fibres can be facilitated by means of the properties of the filling gel or by preheating the filling gel to a point where its viscosity decreases. The preheating is naturally performed within the limits set by the fibre. The final product is a pipe with no relaxation and with the desired excess fibre on both sides of the zero point. The structural behaviour of the optic cable formed of elements prepared in the above-described manner is also stable.

The above-described embodiment is not intended to restrict the invention in any way, but the invention can be modified quite freely within the scope of the claims. Therefore it is clear that the arrangement according to the invention or the details thereof do not have to be exactly similar to those shown in the FIGURE, but other kinds of arrangements are also possible.

What is claimed is:

1. A method for producing a basic element of a multi-element optical cable, comprising extruding a tubular sheathing, at a point of extrusion loosely around an advancing optical fiber component, providing the fibre component with a desired excess length with respect to the sheathing, pulling the sheathing and the fibre component as a unit forward from pulling point located following the point of extrusion to a subsequent stage in a production line, continuously maintaining a tension ($t_3$) in the fibre component passed to the point of extrusion at a controlled level, keeping the fibre component and the sheathing in a straight direction of travel before and at the pulling point, and locating said pulling point at a distance from the point of extrusion at a distance depending on a production rate of the production line.

2. A method according to claim 1, comprising adjusting the position of the pulling point according to the production rate of the production line.

3. A method according to claim 1, wherein said optical fibre component is formed by one or more optical fibres.

4. An arrangement for producing a basic element of a multi-element optical cable, said arrangement comprising a coating tool for forming a loose tubular sheathing around an optical fibre component advancing along a production line, means for providing the optical fibre component with a desired excess length with respect to the sheathing, and a pulling device placed after the coating tool for pulling the sheathing and the optical fibre component as a unit forward to a subsequent stage in the production line, means for tensioning said optical fibre component, as the fibre component passes to said coating tool, at a determined constant level, and means for keeping the direction of travel of the fibre component and the sheathing straight before and at the pulling device, said pulling device being placed at a distance from the coating tool which is a function of a production rate of the production line.

5. The arrangement according to claim 4, wherein said pulling device is movable in accordance with the production rate of the production line.

6. The arrangement according to claim 4, wherein the pulling device comprises a belt pulling device.

* * * * *

UNITED STATES PATENT AND TRADEMARK OFFICE
CERTIFICATE OF CORRECTION

PATENT NO.   : 5,938,987
DATED        : August 17, 1999
INVENTOR(S)  : Teuvo Paivinen It is certified that error appears in the above-identified patent and that said Letters Patent is hereby corrected as shown below:

On title page, item [22], "30" should be – – 3– – .

Signed and Sealed this

Seventh Day of March, 2000

Attest:

Attesting Officer

Q. TODD DICKINSON

Commissioner of Patents and Trademarks